UNITED STATES PATENT OFFICE.

WILLIS EUGENE EVERETTE, OF TACOMA, WASHINGTON.

INSECTICIDE.

No. 798,603.  Specification of Letters Patent.  Patented Sept. 5, 1905.

Application filed April 9, 1904. Serial No. 202,358.

*To all whom it may concern:*

Be it known that I, WILLIS EUGENE EVERETTE, a citizen of the United States, and a resident of Tacoma, in the county of Pierce and State of Washington, have invented certain new and useful Improvements in Insecticides, of which the following is a specification.

The object of my invention is to provide a thoroughly safe and effective composition which when applied to fruit-trees, growing vegetables, and flowers will effectually destroy insects, caterpillars, worms, and their eggs, fungus growth, and other hurtful pests which attack such trees and plants.

To make this compound, I pulverize about one pound of each of the following ingredients: sulfur, resin of pine, soap-powder, sodium oxid, tobacco-stems, castor-oil beans, and pyrethrum-flowers, and add about one pound of asphalt-petroleum, about one pound of fuming sulfuric acid, and about one pound of commercial phenic alcohol, (carbolic acid.) By asphalt-petroleum I mean that class of petroleum which has an asphalt base in distinction from that which has a paraffin base or residue. Crude petroleum-oil with a paraffin base is the kind chiefly used in the manufacture of gasolene, kerosene, &c. When these lighter oils are distilled off, a paraffin residue remains. Crude petroleum-oil with an asphalt base is that chiefly used to sprinkle dusty roads, because when the lighter oils have evaporated away the asphalt will combine with the dust and form a hard road, whereas if the other kind were used the paraffin residue would gradually crumble into powder and blow away with the dust. For this reason in my insecticide I prefer the asphalt-petroleum, because the residue tends to harden on the plant and form a protective covering for it. These ingredients are to be mixed to the condition of a dough-like mass or paste and preferably divided into small portions—say about one-ounce packages. To preserve these packages from the air, they are preferably wrapped in paraffin-paper and tin-foil.

In using this compound for the purposes intended one ounce is to be diluted with about a gallon of boiling water and then sprayed upon the insect-infested tree or vine. For hop-lice and when used with fruits and vegetables generally a weaker solution will suffice—namely, one ounce of the compound dissolved in from three to ten gallons of boiling water. I usually cool the mixture to about 120° Fahrenheit before I spray it on the leaves. For woolly aphis I use it as high as 130° Fahrenheit. For hop-lice (green aphis) I cool to 110° or 115° Fahrenheit to get the best results. For "scale" on citrus fruit I use it as hot as 135° Fahrenheit. For vegetables I cool it to about 110° Fahrenheit. This compound may also be used with great advantage in painting chicken-roosts and fowl-houses by dissolving one ounce of the compound in about five gallons of thick lime-wash.

I claim—

An insecticide compound consisting of equal parts of sulfur, resin of pine, soap-powder, sodium oxid, tobacco-stems, castor-oil beans, pyrethrum-flowers, asphalt-petroleum, fuming sulfuric acid and commercial phenic alcohol, thoroughly mixed together.

WILLIS EUGENE EVERETTE.

Witnesses:
 W. P. PREBLE, Jr.,
 ANNA H. VAN HORENBERG.